J. PREO.
Side-Bar Vehicle.
No. 218,897. Patented Aug. 26, 1879.
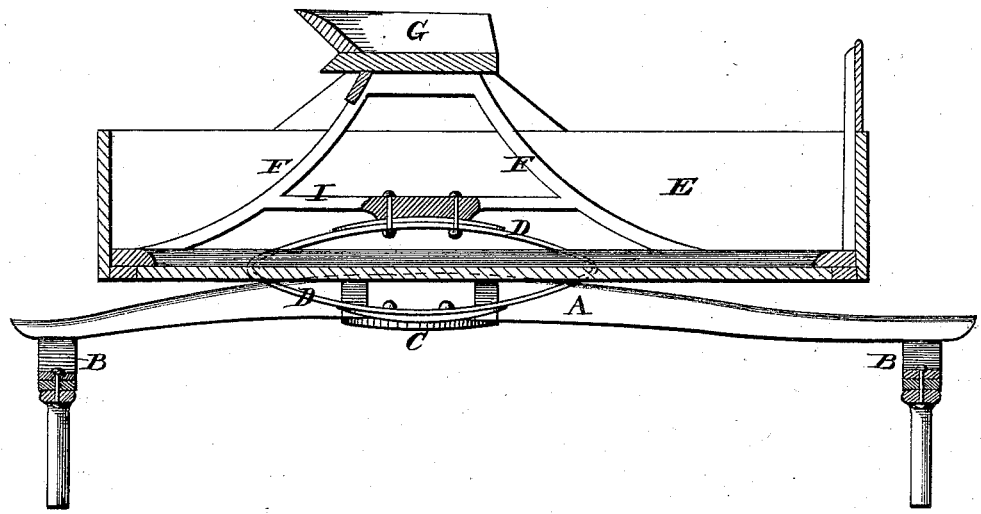
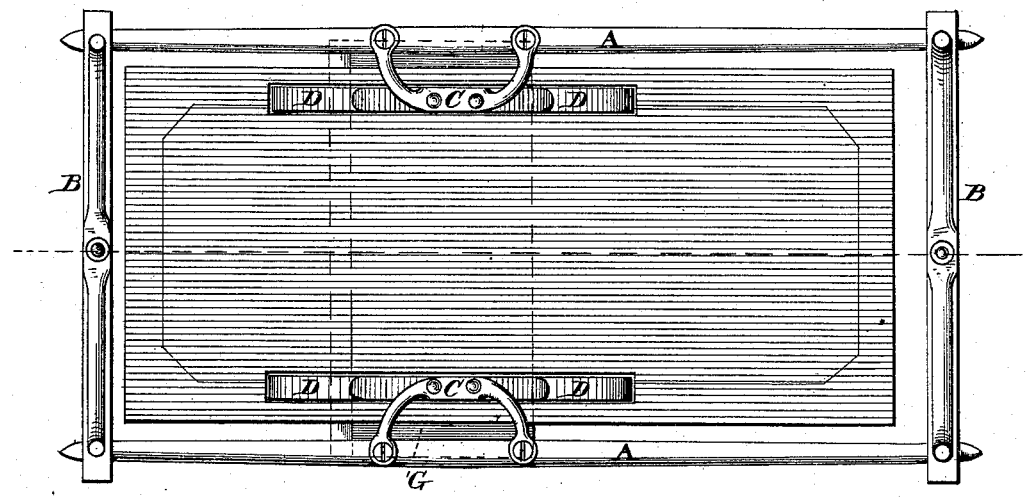

UNITED STATES PATENT OFFICE.

JOHN PREO, OF GREENWICH, NEW YORK.

IMPROVEMENT IN SIDE-BAR VEHICLES.

Specification forming part of Letters Patent No. 218,897, dated August 26, 1879; application filed January 30, 1879.

*To all whom it may concern:*

Be it known that I, JOHN PREO, of Greenwich, in the county of Washington and State of New York, have invented certain new and useful Improvements in Vehicles; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The nature of my invention consists in the construction and arrangement of a side-bar vehicle, as will be hereinafter more fully set forth, and pointed out in the claims.

In the annexed drawings, to which reference is made, Figure 1 is a longitudinal vertical section of a side-bar vehicle embodying my invention. Fig. 2 is a bottom view of the same.

A A represent the side bars of a side-bar vehicle, said side bars being, at their ends, connected to springs B B, in the usual manner. To each side bar A is, by clips or otherwise, firmly secured a metal bar, C, the body of which runs parallel with and on the inside of the side bars, while the ends are turned outward and fastened to the side bar. On the metal bar or bed C is secured an elliptic spring, D.

E represents the body of the vehicle, provided with the seat G, which is supported by means of inclined braces F F at each end, said braces forming part of the frame-work of the body E. These braces are connected by a horizontal bar, I, and to the under side of this bar the elliptic spring D is secured, as shown in Fig. 1. The elliptic springs D D pass through slots in the bottom of the body E, as shown, so that a large portion of each spring is concealed within the body of the vehicle.

I am fully aware that elliptic springs have been used in side-bar vehicles for supporting the wagon-body, and I do not claim such, broadly, as my invention.

With my construction and arrangement of parts, as shown and described, the elliptic springs are supported on the inside of the side bars, on the metallic bars or bed-pieces C C, and the bottom of the body having the slots for the passage of the springs, the body can be placed very low to work between the side bars, and yet have the advantage of being supported upon full elliptic springs.

Having thus fully described my invention, what I claim as new, and desire to secure by Letters Patent, is—

1. In a side-bar vehicle, the body E, having its bottom rigidly connected thereto and slotted at its sides, for allowing the elliptic supporting-springs D to project into the body at the sides, substantially as set forth.

2. In a side-bar vehicle, the combination of the side bars A A, bed-pieces C C, elliptic springs D D, and the body E, having its bottom slotted, and the said springs being connected to the frame-work of the body above the bottom, substantially as and for the purposes herein set forth.

In testimony that I claim the foregoing as my own I have hereto affixed my signature in presence of two witnesses.

JOHN PREO.

Witnesses:
 ESEK ANGELL,
 ALBERT A. MOOR.